(12) United States Patent
Patil et al.

(10) Patent No.: US 8,476,203 B2
(45) Date of Patent: *Jul. 2, 2013

(54) CEMENT COMPOSITIONS COMPRISING SUB-MICRON ALUMINA AND ASSOCIATED METHODS

(75) Inventors: Rahul Chandrakant Patil, Pune (IN); B. Raghava Reddy, Duncan (IN); Abhimanyu Deshpande, Pune (IN); Christopher L. Gordon, Oklahoma City, OK (US); Craig W. Roddy, Duncan, OK (US); Jiten Chatterji, Duncan, OK (US); Roger S. Cromwell, Walters, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,662

(22) Filed: Jan. 4, 2010

(65) Prior Publication Data

US 2010/0095871 A1 Apr. 22, 2010

Related U.S. Application Data

(63) Continuation-in-part of application No. 12/263,954, filed on Nov. 3, 2008, which is a continuation-in-part of application No. 11/747,002, filed on May 10, 2007, now Pat. No. 7,559,369.

(51) Int. Cl.
   *C04B 7/32* (2006.01)
   *C04B 7/02* (2006.01)
   *C04B 7/12* (2006.01)
   *C04B 7/345* (2006.01)
   *E21B 33/00* (2006.01)

(52) U.S. Cl.
   USPC ........... 507/269; 507/219; 507/221; 507/225; 166/285; 106/638; 106/681; 106/692; 106/705; 106/713; 106/789; 106/793; 106/796; 106/802; 106/811

(58) Field of Classification Search
   None
   See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |
| 2,857,286 A | 10/1958 | Striker |
| 2,871,133 A | 1/1959 | Palonen et al. |
| 2,880,096 A | 3/1959 | Hurley |
| 2,890,169 A | 6/1959 | Prokop |
| 2,933,135 A | 4/1960 | Johnson |
| 2,945,769 A | 7/1960 | Gama et al. |
| 2,952,318 A | 9/1960 | Ritch |
| 2,959,223 A | 11/1960 | Harmon et al. |
| 2,978,024 A | 4/1961 | Davis |
| 3,026,938 A | 3/1962 | Huitt et al. |
| 3,168,139 A | 2/1965 | Kennedy et al. |
| 3,219,112 A | 11/1965 | Sauber et al. |
| 3,336,979 A | 8/1967 | Ingraham et al. |
| 3,353,601 A | 11/1967 | Dollarhide et al. |
| 3,366,177 A | 1/1968 | Powers et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,607,326 A | 9/1971 | Serafin |
| RE27,271 E | 1/1972 | Hamsberger et al. |
| 3,748,159 A | 7/1973 | George |
| 3,854,985 A | 12/1974 | Suzuki et al. |
| 3,876,005 A | 4/1975 | Fincher et al. |
| 3,887,009 A | 6/1975 | Miller et al. |
| 3,887,385 A | 6/1975 | Quist et al. |
| 3,888,311 A | 6/1975 | Cooke, Jr. |
| 3,958,638 A | 5/1976 | Johnston |
| 4,018,617 A | 4/1977 | Nicholson |
| 4,031,184 A | 6/1977 | McCord |
| 4,036,301 A | 7/1977 | Powers et al. |
| 4,142,910 A | 3/1979 | Kraemer et al. |
| 4,176,720 A | 12/1979 | Wilson |
| 4,202,795 A | 5/1980 | Burnham et al. |
| 4,268,316 A | 5/1981 | Wills, Jr. |

(Continued)

FOREIGN PATENT DOCUMENTS

| CA | 2153372 | 1/2006 |
|---|---|---|
| CN | 101544488 | 9/2009 |

(Continued)

OTHER PUBLICATIONS

"Effect of the particle size on the micro and nanostructural features of calcium phosphate cement: a kinetic analysis", Biomaterials 25 (2004) 3453-3462.*

(Continued)

*Primary Examiner* — John J Figueroa
(74) *Attorney, Agent, or Firm* — Craig W. Roddy; Tumey L.L.P.

(57) ABSTRACT

Methods and compositions that comprise sub-micron alumina for accelerating setting of a cement composition. An embodiment includes a method of cementing in a subterranean formation. The method may comprise introducing a cement composition into the subterranean formation, wherein the cement composition comprises hydraulic cement, sub-micron alumina, and water. The method further may comprise allowing the cement composition to set in the subterranean formation. Another embodiment includes a cement composition that may comprise hydraulic cement, sub-micron alumina, and water.

29 Claims, No Drawings

U.S. PATENT DOCUMENTS

| | | | |
|---|---|---|---|
| 4,274,881 A | 6/1981 | Langton et al. | |
| 4,284,433 A | 8/1981 | Aignesberger et al. | |
| 4,341,562 A | 7/1982 | Ahlbeck | |
| RE31,190 E | 3/1983 | Detroit et al. | |
| 4,407,677 A | 10/1983 | Wills, Jr. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,506,734 A | 3/1985 | Nolte | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,624,711 A | 11/1986 | Styron | |
| 4,633,950 A | 1/1987 | Delhommer et al. | |
| 4,643,362 A | 2/1987 | Serafin | |
| 4,650,520 A * | 3/1987 | Johnsen et al. | 106/639 |
| 4,660,642 A | 4/1987 | Young | |
| 4,676,317 A | 6/1987 | Fry et al. | |
| 4,676,832 A | 6/1987 | Childs et al. | |
| 4,700,777 A | 10/1987 | Luers | |
| 4,711,401 A | 12/1987 | Serafin | |
| 4,721,160 A | 1/1988 | Parcevaux et al. | |
| 4,741,401 A | 5/1988 | Walles et al. | |
| 4,741,782 A | 5/1988 | Styron | |
| 4,770,796 A | 9/1988 | Jacobs | |
| 4,784,223 A | 11/1988 | Worrall et al. | |
| 4,848,973 A | 7/1989 | Yokota et al. | |
| 4,883,125 A | 11/1989 | Wilson et al. | |
| 4,941,536 A | 7/1990 | Brothers et al. | |
| 4,953,620 A | 9/1990 | Bloys et al. | |
| 4,961,790 A | 10/1990 | Smith et al. | |
| 4,992,102 A | 2/1991 | Barbour | |
| 5,030,366 A | 7/1991 | Wilson et al. | |
| 5,049,288 A | 9/1991 | Brothers et al. | |
| 5,058,679 A | 10/1991 | Hale et al. | |
| RE33,747 E | 11/1991 | Hartley et al. | |
| 5,086,850 A | 2/1992 | Harris et al. | |
| 5,102,558 A * | 4/1992 | McDougall et al. | 507/260 |
| 5,121,795 A * | 6/1992 | Ewert et al. | 166/292 |
| 5,123,487 A * | 6/1992 | Harris et al. | 166/277 |
| 5,125,455 A | 6/1992 | Harris et al. | |
| 5,127,473 A * | 7/1992 | Harris et al. | 166/277 |
| 5,149,370 A * | 9/1992 | Olaussen et al. | 166/292 |
| 5,151,203 A | 9/1992 | Riley et al. | |
| 5,183,505 A | 2/1993 | Spinney | |
| 5,203,629 A | 4/1993 | Valle et al. | |
| 5,207,832 A | 5/1993 | Baffreau et al. | |
| 5,213,160 A | 5/1993 | Nahm et al. | |
| 5,236,501 A | 8/1993 | Nomachi et al. | |
| 5,238,064 A | 8/1993 | Dahl et al. | |
| 5,253,991 A | 10/1993 | Yokota et al. | |
| 5,263,542 A * | 11/1993 | Brothers | 166/293 |
| 5,266,111 A | 11/1993 | Barbour | |
| 5,292,512 A | 3/1994 | Schaefer et al. | |
| 5,295,543 A | 3/1994 | Terry et al. | |
| 5,305,831 A | 4/1994 | Nahm | |
| 5,314,022 A | 5/1994 | Cowan et al. | |
| 5,320,851 A | 6/1994 | Mars et al. | |
| 5,327,968 A | 7/1994 | Onan et al. | |
| 5,337,824 A | 8/1994 | Cowan | |
| 5,339,903 A | 8/1994 | Eoff et al. | |
| 5,340,397 A | 8/1994 | Brothers | |
| 5,346,012 A * | 9/1994 | Heathman et al. | 166/293 |
| 5,352,288 A | 10/1994 | Mallow | |
| 5,358,044 A | 10/1994 | Hale et al. | |
| 5,358,047 A | 10/1994 | Himes et al. | |
| 5,358,049 A | 10/1994 | Hale et al. | |
| 5,361,841 A | 11/1994 | Hale et al. | |
| 5,361,842 A | 11/1994 | Hale et al. | |
| 5,368,103 A | 11/1994 | Heathman et al. | |
| 5,370,185 A | 12/1994 | Cowan et al. | |
| 5,372,641 A | 12/1994 | Carpenter | |
| 5,373,901 A | 12/1994 | Norman et al. | |
| 5,375,661 A * | 12/1994 | Daneshy et al. | 166/278 |
| 5,382,290 A | 1/1995 | Nahm et al. | |
| 5,383,521 A | 1/1995 | Onan et al. | |
| 5,383,967 A | 1/1995 | Chase | |
| 5,389,706 A * | 2/1995 | Heathman et al. | 166/293 |
| 5,398,758 A | 3/1995 | Onan et al. | |
| 5,398,759 A * | 3/1995 | Rodrigues et al. | 166/293 |
| 5,423,379 A | 6/1995 | Hale et al. | |
| 5,439,056 A | 8/1995 | Cowan | |
| 5,454,867 A | 10/1995 | Brothers et al. | |
| 5,456,751 A | 10/1995 | Zandi et al. | |
| 5,458,195 A | 10/1995 | Totten et al. | |
| 5,464,060 A | 11/1995 | Hale et al. | |
| 5,472,051 A | 12/1995 | Brothers | |
| 5,476,144 A | 12/1995 | Nahm et al. | |
| 5,494,513 A | 2/1996 | Fu et al. | |
| 5,499,677 A | 3/1996 | Cowan | |
| 5,515,921 A | 5/1996 | Cowan et al. | |
| 5,518,996 A * | 5/1996 | Maroy et al. | 507/100 |
| 5,520,730 A | 5/1996 | Barbour | |
| 5,529,624 A | 6/1996 | Riegler | |
| 5,536,311 A | 7/1996 | Rodrigues | |
| 5,542,782 A | 8/1996 | Carter et al. | |
| 5,551,976 A | 9/1996 | Allen | |
| 5,569,324 A | 10/1996 | Totten et al. | |
| 5,575,841 A | 11/1996 | Dry | |
| 5,580,379 A | 12/1996 | Cowan | |
| 5,585,333 A | 12/1996 | Dahl et al. | |
| 5,588,488 A | 12/1996 | Vijn et al. | |
| 5,588,489 A | 12/1996 | Chatterji et al. | |
| 5,603,961 A | 2/1997 | Suzuki et al. | |
| 5,660,624 A | 8/1997 | Dry | |
| 5,663,230 A | 9/1997 | Haman | |
| 5,673,753 A | 10/1997 | Hale et al. | |
| 5,688,844 A | 11/1997 | Chatterji et al. | |
| 5,711,383 A | 1/1998 | Terry et al. | |
| 5,716,910 A | 2/1998 | Totten et al. | |
| 5,728,209 A | 3/1998 | Bury et al. | |
| 5,728,654 A | 3/1998 | Dobson et al. | |
| 5,741,357 A * | 4/1998 | Sheikh | 106/692 |
| 5,766,323 A | 6/1998 | Butler et al. | |
| 5,779,787 A | 7/1998 | Brothers et al. | |
| 5,783,541 A | 7/1998 | Tack et al. | |
| 5,795,060 A | 8/1998 | Stephens | |
| 5,820,670 A | 10/1998 | Chatterji et al. | |
| 5,851,960 A | 12/1998 | Totten et al. | |
| 5,866,516 A | 2/1999 | Costin | |
| 5,874,387 A | 2/1999 | Carpenter et al. | |
| 5,879,699 A | 3/1999 | Lerner | |
| 5,897,699 A | 4/1999 | Chatterji et al. | |
| 5,900,053 A | 5/1999 | Brothers et al. | |
| 5,913,364 A | 6/1999 | Sweatman | |
| 5,988,279 A | 11/1999 | Udarbe et al. | |
| 5,989,334 A | 11/1999 | Dry | |
| 6,022,408 A | 2/2000 | Stokes et al. | |
| 6,027,561 A | 2/2000 | Gruber et al. | |
| 6,060,434 A | 5/2000 | Sweatman et al. | |
| 6,060,535 A | 5/2000 | Villar et al. | |
| 6,063,738 A | 5/2000 | Chatterji et al. | |
| 6,138,759 A | 10/2000 | Chatterji et al. | |
| 6,143,069 A | 11/2000 | Brothers et al. | |
| 6,145,591 A | 11/2000 | Boncan et al. | |
| 6,153,562 A | 11/2000 | Villar et al. | |
| 6,167,967 B1 | 1/2001 | Sweatman | |
| 6,170,575 B1 | 1/2001 | Reddy et al. | |
| 6,180,689 B1 * | 1/2001 | Moulin | 523/130 |
| 6,230,804 B1 | 5/2001 | Mueller et al. | |
| 6,244,343 B1 | 6/2001 | Brothers et al. | |
| 6,245,142 B1 | 6/2001 | Reddy et al. | |
| 6,258,757 B1 | 7/2001 | Sweatman et al. | |
| 6,261,360 B1 | 7/2001 | Dry | |
| 6,277,189 B1 | 8/2001 | Chugh | |
| 6,312,515 B1 * | 11/2001 | Barlet-Gouedard et al. | 106/709 |
| 6,315,042 B1 | 11/2001 | Griffith et al. | |
| 6,332,921 B1 | 12/2001 | Brothers et al. | |
| 6,367,550 B1 | 4/2002 | Chatterji et al. | |
| 6,379,456 B1 | 4/2002 | Heathman et al. | |
| 6,390,197 B1 | 5/2002 | Maroy | |
| 6,402,833 B1 | 6/2002 | O'Hearn et al. | |
| 6,409,819 B1 | 6/2002 | Ko | |
| 6,444,316 B1 | 9/2002 | Reddy et al. | |
| 6,457,524 B1 | 10/2002 | Roddy | |

| | | |
|---|---|---|
| 6,471,975 B1 | 10/2002 | Banovetz et al. |
| 6,478,869 B2 | 11/2002 | Reddy et al. |
| 6,488,089 B1 | 12/2002 | Bour et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,500,253 B2 | 12/2002 | Norman et al. |
| 6,502,636 B2 | 1/2003 | Chatterji et al. |
| 6,508,305 B1 | 1/2003 | Brannon et al. |
| 6,524,384 B2 | 2/2003 | Griffith et al. |
| 6,527,051 B1 | 3/2003 | Reddy et al. |
| 6,527,849 B2 | 3/2003 | Dry |
| 6,547,871 B2 | 4/2003 | Chatterji et al. |
| 6,547,891 B2 | 4/2003 | Linden et al. |
| 6,554,067 B1 | 4/2003 | Davies et al. |
| 6,554,071 B1 | 4/2003 | Reddy et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,599,863 B1 | 7/2003 | Palmer et al. |
| 6,610,139 B2 | 8/2003 | Crook et al. |
| 6,626,243 B1 | 9/2003 | Go Boncan |
| 6,631,766 B2 | 10/2003 | Brothers et al. |
| 6,632,527 B1 | 10/2003 | McDaniel et al. |
| 6,645,288 B1 | 11/2003 | Dargaud et al. |
| 6,645,290 B1 | 11/2003 | Barbour |
| 6,648,962 B2 | 11/2003 | Berke et al. |
| 6,656,265 B1 | 12/2003 | Garnier et al. |
| 6,656,266 B1 * | 12/2003 | Barlet-Gouedard et al. .. 106/802 |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,808,561 B2 | 10/2004 | Genge |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,861,392 B2 | 3/2005 | Shaarpour |
| 6,874,578 B1 * | 4/2005 | Garnier et al. ................. 166/293 |
| 6,883,609 B2 * | 4/2005 | Drochon et al. ............... 166/292 |
| 6,887,833 B2 | 5/2005 | Brothers et al. |
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,929 B2 | 6/2005 | Leroy-Delage et al. |
| 6,908,508 B2 | 6/2005 | Brothers |
| 6,911,078 B2 | 6/2005 | Barlet-Gouedard et al. |
| 6,926,081 B2 | 8/2005 | Sweatman et al. |
| 6,962,201 B2 | 11/2005 | Brothers |
| 7,007,755 B2 | 3/2006 | Reddy et al. |
| 7,022,179 B1 | 4/2006 | Dry |
| 7,026,272 B2 | 4/2006 | Reddy et al. |
| 7,032,664 B2 | 4/2006 | Lord et al. |
| 7,033,975 B2 | 4/2006 | Baran et al. |
| 7,048,053 B2 | 5/2006 | Santra et al. |
| 7,059,415 B2 | 6/2006 | Bosma et al. |
| 7,077,203 B1 | 7/2006 | Roddy et al. |
| 7,084,092 B2 | 8/2006 | Patel et al. |
| 7,086,466 B2 | 8/2006 | Roddy |
| 7,138,446 B2 | 11/2006 | Reddy et al. |
| 7,143,828 B2 | 12/2006 | Reddy et al. |
| 7,143,832 B2 | 12/2006 | Freyer |
| 7,156,173 B2 | 1/2007 | Mueller |
| 7,156,174 B2 | 1/2007 | Roddy et al. |
| 7,172,022 B2 | 2/2007 | Reddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,264,053 B2 | 9/2007 | Vargo, Jr. et al. |
| 7,279,447 B2 | 10/2007 | Lal et al. |
| 7,284,609 B2 | 10/2007 | Roddy et al. |
| 7,284,611 B2 | 10/2007 | Reddy et al. |
| 7,294,194 B2 | 11/2007 | Reddy et al. |
| 7,296,597 B1 | 11/2007 | Freyer et al. |
| 7,303,014 B2 | 12/2007 | Reddy et al. |
| 7,335,252 B2 | 2/2008 | Roddy et al. |
| 7,337,841 B2 | 3/2008 | Ravi |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,440 B2 | 7/2008 | Reddy et al. |
| 7,409,991 B2 | 8/2008 | Reddy et al. |
| 7,422,060 B2 | 9/2008 | Hammami et al. |
| 7,424,913 B2 | 9/2008 | Roddy |
| 7,445,668 B2 | 11/2008 | Sommain |
| 7,445,669 B2 | 11/2008 | Roddy et al. |
| 7,451,817 B2 | 11/2008 | Reddy et al. |
| 7,461,696 B2 | 12/2008 | Nguyen et al. |
| 7,478,675 B2 | 1/2009 | Roddy et al. |
| 7,478,678 B2 | 1/2009 | Farrar et al. |
| 7,482,309 B2 | 1/2009 | Ravi et al. |
| 7,559,369 B2 | 7/2009 | Roddy et al. |
| 7,784,542 B2 * | 8/2010 | Roddy et al. .................. 166/293 |
| 7,806,183 B2 | 10/2010 | Roddy et al. |
| 7,846,876 B2 | 12/2010 | Koyanagi |
| 7,892,352 B2 | 2/2011 | Roddy et al. |
| 1,305,247 A1 | 3/2011 | Ravi et al. |
| 8,114,820 B2 | 2/2012 | Crews |
| 8,226,879 B2 | 7/2012 | Genolet et al. |
| 2002/0004464 A1 | 1/2002 | Nelson et al. |
| 2002/0033121 A1 | 3/2002 | Marko |
| 2002/0073894 A1 | 6/2002 | Genge et al. |
| 2002/0073897 A1 | 6/2002 | Trato |
| 2002/0117090 A1 | 8/2002 | Ku |
| 2002/0193257 A1 | 12/2002 | Lee et al. |
| 2003/0089281 A1 | 5/2003 | Berke et al. |
| 2003/0116065 A1 | 6/2003 | Griffith et al. |
| 2003/0116887 A1 | 6/2003 | Scott |
| 2003/0134751 A1 | 7/2003 | Lee et al. |
| 2003/0167970 A1 | 9/2003 | Polston |
| 2003/0168215 A1 * | 9/2003 | Drochon et al. ............... 166/276 |
| 2003/0220204 A1 | 11/2003 | Baran et al. |
| 2003/0234103 A1 * | 12/2003 | Lee et al. ...................... 166/293 |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261990 A1 | 12/2004 | Bosma et al. |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0056191 A1 | 3/2005 | Brothers et al. |

| | | | |
|---|---|---|---|
| 2005/0061206 A1 | 3/2005 | Reddy et al. | |
| 2005/0072599 A1 | 4/2005 | Luke et al. | |
| 2005/0084334 A1 | 4/2005 | Shi et al. | |
| 2005/0096207 A1 | 5/2005 | Urbanek | |
| 2005/0098317 A1 | 5/2005 | Reddy et al. | |
| 2005/0113260 A1 | 5/2005 | Wood | |
| 2005/0113262 A1 | 5/2005 | Ravi et al. | |
| 2005/0133221 A1 | 6/2005 | Chatterji et al. | |
| 2005/0173117 A1 | 8/2005 | Roddy | |
| 2005/0199401 A1 | 9/2005 | Patel et al. | |
| 2006/0016598 A1 | 1/2006 | Urbanek | |
| 2006/0025312 A1 | 2/2006 | Santra et al. | |
| 2006/0086503 A1 | 4/2006 | Reddy et al. | |
| 2006/0089851 A1 | 4/2006 | Silby et al. | |
| 2006/0122071 A1 | 6/2006 | Reddy et al. | |
| 2006/0162926 A1 | 7/2006 | Roddy | |
| 2006/0166834 A1 | 7/2006 | Roddy | |
| 2006/0177661 A1 | 8/2006 | Smith et al. | |
| 2006/0260512 A1 | 11/2006 | Nordmeyer | |
| 2006/0260513 A1 | 11/2006 | Guiterrez et al. | |
| 2006/0278131 A1 | 12/2006 | Hunt | |
| 2007/0012436 A1 | 1/2007 | Freyer | |
| 2007/0015668 A1 | 1/2007 | Harrower et al. | |
| 2007/0017676 A1 | 1/2007 | Reddy et al. | |
| 2007/0056475 A1 | 3/2007 | Roddy et al. | |
| 2007/0056479 A1 | 3/2007 | Gray | |
| 2007/0056732 A1 | 3/2007 | Roddy et al. | |
| 2007/0056733 A1 | 3/2007 | Roddy et al. | |
| 2007/0062691 A1 | 3/2007 | Reddy et al. | |
| 2007/0102157 A1 | 5/2007 | Roddy et al. | |
| 2007/0125534 A1 | 6/2007 | Reddy et al. | |
| 2007/0137528 A1 | 6/2007 | LeRoy-Delage et al. | |
| 2007/0151484 A1 | 7/2007 | Reddy et al. | |
| 2007/0151724 A1 | 7/2007 | Ohmer et al. | |
| 2007/0151730 A1 | 7/2007 | Reddy et al. | |
| 2007/0186820 A1 | 8/2007 | O'Hearn | |
| 2007/0204765 A1 | 9/2007 | LeRoy-Delage et al. | |
| 2007/0227734 A1 | 10/2007 | Freyer | |
| 2007/0246225 A1 | 10/2007 | Hailey, Jr. et al. | |
| 2007/0255457 A1 | 11/2007 | Whitcomb et al. | |
| 2008/0017376 A1 | 1/2008 | Badalamenti et al. | |
| 2008/0058229 A1 | 3/2008 | Berkland et al. | |
| 2008/0099203 A1 | 5/2008 | Mueller et al. | |
| 2008/0108524 A1 | 5/2008 | Willberg et al. | |
| 2008/0135250 A1 | 6/2008 | Bosma et al. | |
| 2008/0156491 A1 | 7/2008 | Roddy et al. | |
| 2008/0261027 A1 | 10/2008 | Li et al. | |
| 2008/0261834 A1 | 10/2008 | Simon | |
| 2008/0261934 A1 | 10/2008 | Simon | |
| 2008/0277116 A1* | 11/2008 | Roddy et al. | 166/292 |
| 2009/0088348 A1 | 4/2009 | Roddy | |
| 2009/0114126 A1 | 5/2009 | Roddy | |
| 2009/0120644 A1 | 5/2009 | Roddy | |
| 2009/0124522 A1 | 5/2009 | Roddy | |
| 2009/0139719 A1 | 6/2009 | Luo | |
| 2009/0200029 A1 | 8/2009 | Roddy et al. | |
| 2009/0236097 A1* | 9/2009 | Roddy et al. | 166/293 |
| 2009/0260544 A1 | 10/2009 | Roddy | |
| 2010/0016183 A1 | 1/2010 | Roddy et al. | |
| 2010/0025039 A1 | 2/2010 | Roddy et al. | |
| 2010/0075874 A1 | 3/2010 | Mercado et al. | |
| 2010/0096135 A1 | 4/2010 | Roddy et al. | |
| 2011/0162845 A1 | 7/2011 | Ravi et al. | |

FOREIGN PATENT DOCUMENTS

| | | |
|---|---|---|
| DE | 102007042078 | 3/2009 |
| EP | 0748782 | 12/1996 |
| EP | 0814067 | 12/1997 |
| EP | 1236701 | 9/2002 |
| EP | 1394137 | 7/2003 |
| EP | 1348831 | 10/2003 |
| EP | 1686234 A1 | 8/2006 |
| EP | 1719741 A1 | 11/2006 |
| EP | 2465910 A1 | 11/2009 |
| FR | 2787105 | 6/2000 |
| GB | 1469954 | 4/1997 |
| GB | 2429725 | 3/2007 |
| JP | 52117316 | 10/1977 |
| JP | 10110487 | 4/1998 |
| SU | 1373781 | 2/1988 |
| WO | WO 83/01443 | 4/1983 |
| WO | 9011977 | 10/1990 |
| WO | WO 97/05079 | 2/1997 |
| WO | WO 97/49644 | 12/1997 |
| WO | WO 98/54108 | 12/1998 |
| WO | WO 00/63134 | 1/2000 |
| WO | WO 00/49272 | 8/2000 |
| WO | WO 0050357 A1 * | 8/2000 |
| WO | WO 0187796 A1 * | 11/2001 |
| WO | WO 03/008756 | 1/2003 |
| WO | WO 03/031364 | 4/2003 |
| WO | WO 2004/001188 | 12/2003 |
| WO | WO 2004/057715 | 7/2004 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2005/080287 | 8/2005 |
| WO | WO 2006/032841 | 3/2006 |
| WO | WO 2006/053896 | 5/2006 |
| WO | 2008034461 | 3/2008 |
| WO | WO 2008/034461 | 3/2008 |
| WO | WO 2009030758 | 3/2009 |

OTHER PUBLICATIONS

USPTO Notice of Allowance from U.S. Appl. No. 12/426,393, dated Dec. 16, 2010.

"Effect of Nano-SiO2 on heat of hydration of portland cement," Xu et al., Nanjing Gongye Daxue Xuebao, Ziran Kexueban (2007), 29(4), 45-48, abstract only.

"Application of nanometer silica in inorganic nonmetallic materials," Deng et al., Taoci (Xiangyang China) 2007, (9), 8-12, abstract only.

"Reaction mechanism analyses of cement based composite materials modified by nano-silica," Xu et al., Kuangye Gongcheng (Changsha, China), 2007, 27(3), 99-102, abstract only.

"Research on Reinforcement of cement composites and relevant mechanism," Yu et al., Qiangdoa Keji Daxue Xuebao, Ziran Kexueban (2006), 27(2), 148-151, abstract only.

"Antagonistic Effect of superplasticizer and colloidal nanosilica in the hydration of Alite and Belite pastes," Bjoernstrom et al., Journal of Materials Science, 2007, 42(11), 3901-3907, abstract only.

"Nano-concrete: possibilities and challenges," Balaguru et al., RILEM Proceedings (2005), PRO 45 (2nd Int'l Symposium on Nanotechnology in construction (NICOM2), 2005, 233-243, abstract only.

"A comparative study on the pozzolanic activity between nano-SiO2 and silica fume," Ye et al., Journal of Wuhan Univ of Technology, Mat'ls Science Edition (2006), 21(3), 153-157, abstract only.

"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 2004), 495-505, abstract only.

"Accelerating effects of colloidal nano-silica for beneficial calcium-silicate-hydrate formation in cement," Bjornstrom et al., Chemical Physics Letters (2004), 392 (1-3), 242-248, abstract only.

"Experimental study on cement-based composites with nano-SiO2," Feng et al., Cailiao Kexue Yu Gongcheng Zuebao Bianjibu (2004), 22(2), 224-227.

"Strong and bioactive composites containing nano-silica-fused whiskers for bone repair," Xu et al., Biomaterials (2004), 25(19), 4615-4626, abstract only.

Research on properties of Portland cement added with nano-SiO2, Wang et al., RILEM Proceedings (2003), PRO 32 (International Conference on Advances in Concrete and Structures, 2003, vol. 1), 154-161, abstract only.

"Comparison on properties of high strength concrete with nano-SiO2 and silica fume added," Ye et al., Jianzhu Cailiao Xuebao (2003), 6(4), 381-385, abstract only.

"Study on compound effect of silica fume and nano-SiOx for cementing composite materials," Tang et al., Guisuanyan Xuebao (2003), 3(5), 523-527, abstract only.

"Effect of nano-SiOx and silica fume on cement paste water demand," Li et al., Shenyang Jianzhu gongcheng Xueyuan Xuebao, Ziran Kexueban (2002), 18(4), 278-281, abstract only.

"Hydration reaction between C3S and fly ash, silica fume, nano-SiO2, and microstructure of hydrated pastes," Ba et al., Guisuanyan Xuebao (2002), 30(6), 780-784, abstract only.

"Nano-silica—an additive for high-strength concrete," Wagner et al., Wissenschaftliche Zeitschrift—Hoschule fuer Architektur und Bauwesen Weimar—Universitaet (1994), 40 (5/6/7), 183-87, abstract only.

"Investigations on the preparation and mechanical properties of the nano-alumina reinforced cement composite," Li et al., Materials Letters (2006), 0(3), 356-359, abstract only.

"Effect of secondary interface microstructure on pore structure and performance of cement-based materials," Feng et al., Cailiao Yanjiu Xuebao (2003), 17(5), 489-494, abstract only.

"Preparation of multifunctional dry-power paints," Yanmin Gao, Faming Zhuanli Shenqing gongkai Shuomingshu, 4 pages, 2005, abstract only.

USPTO office action from U.S. Appl. No. 12/426,393, dated Jul. 2, 2010.

USPTO notice of allowance from U.S. Appl. No. 12/472,561, dated Jun. 29, 2010.

Bartlet-Gouedard, "A Non-Conventional Way of Developing Cement Slurry for Geothermal Wells", 2001.

Poon, "A Study of the Hydration of Natural Zeolite Blended Cement Pastes", 1999.

"Beneficial use of Solid Waste in Maine", Apr. 14, 2005.

Smith, "Cementing" Society of Petroleum Engineers, p. 38, 1990.

Smith, "Cementing" Society of Professional Engineers, pp. 14, 38, 1987.

Chan, Comparative Study of the Initial Surface Absorption and Chloride Diffusion of High Performance Zeolite Silica Fume and PFA concretes, 1999.

Rogers, "Designing a Remedial Acid Treatment for Gulf of Mexico Deepwater Turbidite Sands Containing Zeolite Cement", 1996.

Janotka, "Effect of Bentonite and Zeolite on Durability of Cement Suspension Under Sulfate Attack", 1998.

Ding, "Extreme Vertices Design of Concrete With Combined Mineral Admixtures", 1999.

"Kiln Dusts", Apr. 14, 2005.

Sersale, "Portland-Zeolite-Cement for Minimizing Alkali-Aggregate Expansion", 1987.

"Standards for the Management of Cement Kiln Dust Waste", Apr. 14, 2005.

Naiqian, "Study on the Suppression Effect of Natural Zeolite on Expansion of Concrete Due to Alkali-Aggregate Reaction", 1998.

Janotka, "The Properties of Mortar Using Blends With Portland Cement Clinker, Zeolite Tuff and Gypsum", 1995.

Herndon, "Setting Downhole Plugs: A State-of-the-Art", Petroleum Engineer International, Apr. 1978.

Sugama, "Carbonation of Hydrothermally Treated Phosphate-Bonded Calcium Aluminate Cements", pp. 1-9 (undated but admitted as prior art).

Sugama, "Hot Alkali Carbonation of Sodium Metaphosphate Modified Fly Ash/Calcium Aluminate Blend Hydrothermal Cements", pp. 1661-1672, Sep. 11, 1996.

"Use of Cement Kiln Dust for the Stabilization of Soils", R. L. Parsons, et al., Apr. 14, 2005.

Feng, "Zeolite Ceramiste Cellular Concrete", 2000.

Marfil, "Zeolite Crystallization in Portland Cement Concrete Due to Alkali-Aggregate Reaction", 1993.

Atkins, "Zeolite P In Cements", "Its Potential for Immobilizing Toxic and Radioactive Waste Species", 1995.

HES Brochure "AQF-2 Foaming Agent", 1999.

HES Brochure "Halad-23 Fluid Loss Additive", 2000.

HES Brochure "Halad-344 Fluid Loss Additive", 1998.

HES Brochure "Halad-413 Fluid Loss Additive", 1999.

HES Brochure "Howco Suds Surfactant", 1999.

HES Brochure "HR-12 Cement Retarder", 1999.

HES Brochure "HR-15 Cement Retarder", 1999.

HES Brochure "HR-25 Cement Retarder" dated 1999.

HES Brochure "HR-4 Cement Retarder", 1999.

HES Brochure HR-5 Cement Additive, 1998.

HES Brochure "HR-7 Cement Retarder", 1999.

HES Brochure "Pozmix A Cement Additive", 1999.

HES Brochure "Pozmix Cement and Pozmix 140" (undated but admitted as prior art).

HES Brochure "SCR-100 Cement Retarder A Valuable Time Saver", 1994.

HES Brochure "SCR-100 Cement Retarder", 1999.

HES Brochure "SCR-500L High Temp Retarder", 2000.

HES Brochure "ThermaLock™ Cement for Corrosive $CO_2$ Environments", 1999.

"3M Scotchlite, Glass Bubbles Floated Product Series Product Information", 1999.

"API Specification for Materials and Testing for Well Cements", API Spec. 10, 5th ed., pp. 7, 19-21, Jul. 1, 1980.

"Appendix A", API RP 13B-2, 2d ed.; pp. 6-8, Dec. 1, 1991.

LAFARGE brochure "TerraCem™", Aug. 2006.

LAFARGE MSDS "Cement Kiln Dust", Mar. 3, 2005.

LAFARGE MSDS "LaFarge Blended Cement (cement)", Mar. 3, 2005.

TXI Material Safety Data Sheet for PRESSUR-SEAL, Oct. 2003.

"Manufacture of supplementary cementitious materials from cement kiln dust", Mishulovich et al., World Cement Research and Development, p. 116-120, Mar. 1996.

"Alkali-activated binders by use of industrial by-products", Buchwald et al., Cement and concrete Research 35, p. 968-793, 2005.

Answer 13 of 24 Chemical Abstracts on STN "Manufacture of ceramic particles from floatstone and fly ash", CN 1182062 (abstract only) (undated but admitted as prior art).

Answer 3 of 24 Chemical Abstracts on STN "Effect of cement kiln dust substitution on chemical and physical properties and compressive strength of Portland and slag cements", Adb El-aleem et al. (abstract only), 2005.

Office Action from U.S. Appl. No. 11/223,671, Dec. 15, 2005.

Office Action from U.S. Appl. No. 11/271,431, Mar. 6, 2006.

Office Action from U.S. Appl. No. 11/223,671, Mar. 31, 2006.

Office Action from U.S. Appl. No. 11/271,431, May 31, 2006.

Office Action from U.S. Appl. No. 11/271,431 (Advisory Action), Jul. 11, 2006.

Office Action from U.S. Appl. No. 11/416,563, Jul. 21, 2006.

Office Action from U.S. Appl. No. 11/403,032, Jul. 24, 2006.

Office Action from U.S. Appl. No. 11/271,431, Aug. 15, 2006.

Office Action from U.S. Appl. No. 11/440,627, Aug. 21, 2006.

Office Action from U.S. Appl. No. 11/402,741, Oct. 19, 2006.

Office Action from U.S. Appl. No. 11/484,951, Oct. 26, 2006.

Office Action from U.S. Appl. No. 11/484,951, Dec. 21, 2006.

Office Action from U.S. Appl. No. 11/223,703, Jan. 17, 2007.

Office Action from U.S. Appl. No. 11/402,741, Feb. 2, 2007.

Office Action from U.S. Appl. No. 11/223,485, Feb. 28, 2007.

Office Action from U.S. Appl. No. 11/223,669, Feb. 28, 2007.

Office Action from U.S. Appl. No. 11/271,690, Mar. 13, 2007.

Office Action from U.S. Appl. No. 11/402,741, Mar. 22, 2007.

Office Action from U.S. Appl. No. 11/223,703, Apr. 25, 2007.

Office Action from U.S. Appl. No. 11/402,741, May 29, 2007.

Office Action from U.S. Appl. No. 11/223,669, Jun. 18, 2007.

Office Action from U.S. Appl. No. 11/416,754 (Notice of Allowance), Jul. 2, 2007.

Office Action from U.S. Appl. No. 11/223,485 (Notice of Allowance), Aug. 3, 2007.

Office Action from U.S. Appl. No. 11/257,261, Aug. 10, 2007.

Office Action from U.S. Appl. No. 11/271,690 (Notice of Allowance), Aug. 13, 2007.

Office Action from U.S. Appl. No. 11/402,741, Sep. 6, 2007.

Office Action from U.S. Appl. No. 11/223,669, Oct. 9, 2007.

Office Action from U.S. Appl. No. 11/223,750, Oct. 16, 2007.

Office Action from U.S. Appl. No. 11/416,754 (Notice of Allowance), Oct. 17, 2007.

Office Action from U.S. Appl. No. 11/257,261 (Notice of Allowance), Oct. 23, 2007.

Office Action from U.S. Appl. No. 11/402,741, Oct. 24, 2007.

Office Action from U.S. Appl. No. 11/223,750 (Notice of Allowance), Dec. 11, 2007.

Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Notice of Allowance), Oct. 21, 2008.
Harris et al., "Successful Remedial Operations Using Ultrafine Cement", SPE 24294, 1992.
Heathman et al., "Case Histories Regarding the Application of Microfine Cements", Cementing Technical Paper SPE 23926, 1992.
Halliburton brochure entitled "Micro Matrix Cement", Nov. 2006.
Dalrymple et al., "A Selective Water Control Process", SPE 24330, 1992.
Halim et al., "Preparation of an ultra fast binding cement from calcium silicate-based mixed oxide nanoparticles", Nanotechnology 18, 2007.
Epik Energy brochure entitled "Nanocement".
Nanocor brochure entitled "Nanoclay Structure", Jun. 24, 2008.
He et al., "Chloride Permeability and Microstructure of Portland Cement Mortars Incorporating Nanomaterials", Abstract, Transportation Research Board Annual Meeting 2007 Paper #08-1041, 2008.
Chang et al., "Material Properties of Portland Cement Paste with Nano-Montmorillonite," J. Material Science, May 18, 2007.
Foreign communication from a related counterpart application, Jul. 5, 2005.
Office Action from U.S. Appl. No. 10/775,348, Nov. 23, 2005.
Office Action from U.S. Appl. No. 10/775,348, May 2, 2006.
Notice of Allowance from U.S. Appl. No. 10/775,348, Jun. 6, 2006.
Foreign communication from a related counterpart application, Jun. 29, 2007.
Notice of Allowance from U.S. Appl. No. 11/388,644, Jan. 3, 2008.
Office Action from U.S. Appl. No. 12/008,923, May 20, 2008.
Notice of Allowance from U.S. Appl. No. 12/008,923, Jul. 22, 2008.
Office Action from U.S. Appl. No. 11/388,645, Apr. 3, 2009.
Office Action from U.S. Appl. No. 11/388,645, Jul. 30, 2009.
Nanocor Technical brochure entitled "Nanoclay Structures", Mar. 18, 2009.
Nanofil SE 3000, "Active nanofiller for polymr applications", Product Bulletin/Nanofil, Southern Clay Products.
Halliburton brochure entitled, "Cementing WellLife III Cementing Service", Apr. 2008.
Darbe, "Slurry Design Considerations for Mechanically Enhanced Cement Systems", AADE-08-DF-HO-06, 2008.
Halamickova, "Water Permeability and Chloride Ion Diffusion in Portland Cement Mortars: Relationship to Sand Content and Critical Pore Diameter", Cement and Concrete Research, vol. 25, No. 4, pp. 790-802, 1995.
Montmorillonite, Wikipedia encyclopedia, 2009.
Ravi, "Interventionless Zonal Isolation", Cementing, May 2008.
Schlumberger brochure, "Futur Active set-cement technology for long-term zonal isolation", 2007.
Halliburton brochure, "WellLife III Cementing Service for CO2 Environments", Jun. 2009.
Hunter, "Three Key Mechanisms Deliver Zonal Isolation", IADC.
Office Action from U.S. Appl. No. 11/747,002, Apr. 2, 2008.
Office Action from U.S. Appl. No. 11/747,002, May 27, 2008.
Office Action from U.S. Appl. No. 11/747,002, Jul. 10, 2008.
Office Action from U.S. Appl. No. 11/747,002, Mar. 3, 2009.
PCT International Search Report and Written Opinion for International Application No. PCT/GB2010/000485 dated May 21, 2010.
PCT International Search Report for International Application No. PCT/GB2010/001806, dated Jan. 20, 2011.
PCT Written Opinion for International Application No. PCT/GB2010/001806, dated Jan. 20, 2011.
English language abstract of CN 101544488, published Sep. 30, 2009.
Office Action from U.S. Appl. No. 12/426,645, dated May 5, 2010.
Office Action from U.S. Appl. No. 12/472,561, dated May 5, 2010.
USPTO Office Action for U.S. Appl. No. 12/833,189 dated Feb. 17, 2011.
International Search Report for PCT/GB/2010/001045 dated Jul. 21, 2010.
Written Opinion of the International Searching Authority for PCT/GB/2010/001045 dated Jul. 21, 2010.
USPTO Office Action for U.S. Appl. No. 11/388,645 dated Aug. 17, 2010.
PCT International Searching Authority for International Application No. PCT/GB2009/002596 dated Feb. 8, 2010.
USPTO Office Action for U.S. Appl. No. 12/833,189 dated Oct. 1, 2010.
USPTO Office Action for U.S. Appl. No. 12/833,189 dated Nov. 10, 2010.
USPTO Office Action for U.S. Appl. No. 12/567,782 dated Apr. 5, 2011.
USPTO Office Action for U.S. Appl. No. 12/567,783 dated Apr. 6, 2011.
MacLaren et al., "Cement: Its Chemistry and Properties", Chemistry for Everyone, vol. 80, No. 6, Journal of Chemical Education, pp. 623-635, Jun. 2003.
Hewlett, Peter C., "Lea's Chemistry of Cement and Concrete", Fourth Edition, Elsevier Ltd., pp. 716-722, 1998.
"Calcium aluminate cements", Retrieved from "http://en.wikipedia.org/wiki/Calcium_aluminate_cements", pp. 1-3, Feb. 2011.
"Calcium aluminates", Retrieved from "http://en.wikipedia.org/wiki/Calcium_aluminates", pp. 1-2, Mar. 2011.
USPTO Office Action for U.S. Appl. No. 12/263,954 dated Aug. 8, 2011.
USPTO Office Action for U.S. Appl. No. 12/567,783 dated Aug. 23, 2011.
USPTO Office Action for U.S. Appl. No. 12/833,189 dated Oct. 11, 2011.
Campillo et al., "Improvement of initial mechanical strength by nanoalumina in belite cements", Science Direct, Materials Letters 61, pp. 1889-1892, 2007.
PCT International Search Report and Written Opinion for International Application No. PCT/GB2011/000003 dated Apr. 18, 2011.
USPTO Office Action for U.S. Appl. No. 12/833,189 dated Jul. 18, 2011.
USPTO Office Action for U.S. Appl. No. 12/263,954 dated Apr. 20, 2011.
USPTO Office Action for U.S. Appl. No. 12/567,782 dated Apr. 25, 2011.
USPTO Office Action for U.S. Appl. No. 12/833,189 dated May 16, 2011.
USPTO Office Action for U.S. Appl. No. 12/833,189 dated Feb. 7, 2012.
HES Brochure "Latex 2000", Aug. 2006.
USPTO Office Action for U.S. Appl. No. 12/567,782 dated Mar. 2, 2012.
USPTO Office Action for U.S. Appl. No. 13/052,471 dated Mar. 6, 2012.
International Search Report for PCT/GB2010/001805 dated Mar. 31, 2011.
Written Opinion for PCT/GB2010/001805 dated Mar. 27, 2012.
USPTO Office Action for U.S. Appl. No. 13/431,701 dated Nov. 9, 2012.
USPTO Office Action for U.S. Appl. No. 12/567,782 dated Jul. 25, 2012.
USPTO Office Action for U.S. Appl. No. 13/052,471 dated Jun. 28, 2012.
Written Opinion of the International Searching Authority for PCT/GB/2010/000485 dated Oct. 25, 2011.

Written Opinion of the International Searching Authority for PCT/GB/2011/000003 dated Jul. 12, 2012.
Communication from EPO for EPO App. No. 12159772.8 dated May 3, 2012.
Li et al., "Investigations on the preparation and mechanical properties of the nano-alumina reinforced cement composite", Science Direct, Materials Letters 60, pp. 356-359, 2006.
Office Action from U.S. Appl. No. 12/567,782 dated Feb. 8, 2013.
Office Action from U.S. Appl. No. 13/435,701 dated Feb. 19, 2013.
Office Action from U.S. Appl. No. 13/458,112 dated Mar. 15, 2013.
Office Action from U.S. Appl. No. 12/833,189 dated Feb. 6, 2013.
Office Action from U.S. Appl. No. 13/443,934 dated Mar. 4, 2013.
International Search Report and Written Opinion for PCT/GB2010/0010445 dated Jul. 21, 2010.
Office Action from U.S. Appl. No. 13/052,471 dated Feb. 4, 2013.
Office Action from U.S. Appl. No. 12/263,954 dated Mar. 14, 2013.

* cited by examiner

CEMENT COMPOSITIONS COMPRISING SUB-MICRON ALUMINA AND ASSOCIATED METHODS

CROSS-REFERENCE TO RELATED APPLICATIONS

The present application is a continuation-in-part of U.S. patent application Ser. No. 12/263,954, filed Nov. 3, 2008, entitled "Cement Compositions and Methods Utilizing Nano-Hydraulic Cement," which is a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to cementing operations. More particularly, in certain embodiments, the present invention relates to cement compositions and methods of cementing in a subterranean formation that include sub-micron alumina for accelerating setting.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

The hydration of the cement in these cementing methods is a complex process because several phases may take part in the reaction simultaneously. In order to control the reaction processes to render the compositions suitable for well cementing, various additives such as retarders, strength enhancers, and accelerators may be added. However, the operating conditions for wells are becoming more challenging and demanding, and the search for new materials continues to meet these challenges. For instance, cement slurries used in well cementing often encounter problems of gaining sufficient strength in a reasonable amount of time for well operations to continue. The costs associated with wait-on-cement ("WOC") play an important role in well cementing. This problem may be further aggravated if latex is used with the cement. Furthermore, when latex is present in cement slurries, addition of calcium salts or other salts to accelerate the setting of cement, for example, at low temperatures, can cause coagulation of the latex with resultant gelling of the cement slurries. This gelling may result in premature loss of fluidity of the cement slurry before placement in the desired location in the well bore. Latex may be used for fluid loss control, to provide resiliency to the set cement, and/or to reduce the issues associated with gas channeling. Latex-containing cement compositions, however, may have slower strength development with respect to comparable cement compositions.

SUMMARY

The present invention relates to cementing operations. More particularly, in certain embodiments, the present invention relates to cement compositions and methods of cementing in a subterranean formation that include sub-micron alumina for accelerating setting.

An embodiment of the present invention includes a method of cementing in a subterranean formation comprising: introducing a cement composition into the subterranean formation, wherein the cement composition comprises hydraulic cement, sub-micron alumina, and water; and allowing the cement composition to set in the subterranean formation.

Another embodiment of the present invention includes a method of cementing in a subterranean formation comprising: preparing a cement composition comprising hydraulic cement, sub-micron alumina for accelerating setting of the cement composition, latex, and water, wherein the sub-micron alumina has a particle size of about 150 nm to about 950 nm, wherein preparing the cement composition comprises providing a colloidal alumina dispersion comprising the sub-micron alumina in an aqueous base fluid; introducing the cement composition into a well bore in a space between the subterranean formation and a conduit disposed in the well bore; and allowing the cement composition to set.

Yet another embodiment includes a cement composition comprising hydraulic cement, sub-micron alumina, and water.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to cementing operations. More particularly, in certain embodiments, the present invention relates to cement compositions and methods of cementing in a subterranean formation that include sub-micron alumina for accelerating setting.

There may be several potential advantages to the methods and compositions of the present invention, only some of which may be alluded to herein. One of the many advantages of the present invention is that inclusion of sub-micron alumina in cement compositions may improve the mechanical properties of the cement composition. By way of example, inclusion of sub-micron alumina may provide accelerated setting and, thus, accelerated strength development, particularly in latex-containing cement compositions. While the methods and compositions of the present invention may be suitable for use in a wide variety of cementing operations, they may be particularly suitable for use in latex-containing cement compositions in low temperature wells, such as those having a bottomhole circulating temperature of about 40° F. to about 180° F. and, alternatively, of about 40° F. to about 125° F.

An embodiment of the cement compositions of the present invention comprises hydraulic cement, sub-micron alumina, and water. In certain embodiments, the cement compositions may further comprise latex. Those of ordinary skill in the art will appreciate that the example cement compositions generally should have a density suitable for a particular application. By way of example, the cement composition may have a density in the range of about 4 pounds per gallon ("lb/gal") to about 20 lb/gal. In certain embodiments, the cement compositions may have a density in the range of about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the cement compositions of the present invention comprise a hydraulic cement. Any of a variety of hydraulic cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica/lime cements and combinations thereof. In certain embodiments, the hydraulic cement may comprise a Portland cement. The Portland cements that may be suited for use in embodiments of the present invention are classified as Class A, C, G and H cements according to American Petroleum Institute, *Recommended Practice for Testing Well Cements*, API Specification 10B-2 (ISO 10426-2), First edition, July 2005. In addition, in some embodiments, cements suitable for use in the present invention may include cements classified as ASTM Type I, II, or III. Belite cements also may be suitable for use in embodiments of the present invention. Belite cements typically contain belite (dicalcium silicate, $C_2S$) as the sole or primary calcium silicate. For example, belite cement may comprise belite in an amount of at least about 50% by weight of calcium silicates. By way of further example, a belite cement may comprise belite in an amount of at least about 80% by weight of calcium silicates and, alternatively, in an amount of at least about 95% by weight of calcium silicates. However, due to their slower rate of strength development, belite cements may not be suitable for certain applications, such as in latex-containing cement compositions.

Embodiments of the cement compositions of the present invention further comprise sub-micron alumina. As used herein, sub-micron alumina is defined as alumina having any one of the structural features or dimensions, for example, length, width, thickness, or diameter, of greater than about 100 nanometers ("nm") and less than about 1 micron or, in a preferred range, of greater than about 150 nm to about 950 nm. For example, the sub-micron alumina may have a particle size in the range of about 200 nm to about 800 nm and, alternatively, in the range of about 400 nm to about 500 nm. In contrast to sub-micron alumina, it should be understood that nano-alumina has a particle size of less than about 100 nm. Sub-micron alumina, however, may be more useful than nano-alumina due, for example, to its low cost as compared with nano-materials. It should be noted that the sub-micron alumina may be used in combination with differently sized particles of alumina, in accordance with present embodiments. For example, alumina with particle sizes greater than about 1 micron and/or less than about 100 nm may be included in a cement composition in accordance with present embodiments.

As used herein, "particle size" refers to volume surface mean diameter ("$D_S$") which is related to the specific surface area. Volume surface mean diameter may be defined by the following formula: $D_S=6/(\Phi_S A_w \rho_p)$ where $\Phi_S$=Sphericity; $A_w$=Specific surface area and $\rho_p$=Particle density. It should be understood that the particle size of the sub-micron alumina may vary based on the measurement technique, sample preparation, and sample conditions (e.g., temperature, concentration, etc.). One technique for measuring particle size of the sub-micron alumina at room temperature (approx. 80° F.) includes dispersing the particle in a suitable solvent (such as chloroform, dichloroethane, acetone, methanol, ethanol, water, etc.) by sonification and proper dilution. A dispersing agent may be used to deagglomerate the particles, if needed. The diluted, dispersed solution may then be placed on a carbon-coated copper grid with 300 mesh size by using a micropipette. It may then be dried and examined by Transmission electron microscopy (TEM). The particle size distribution may be obtained with high accuracy using an appropriate computation technique. By way of example, TEM image processing may use image-processing software such as Image-Pro® Plus software from Media Cybernetics to determine the particle size. Another example technique involves use of calibrated drawing tools in Digital Micrograph software followed by statistical analysis of the data with Kaleida-Graph software to determine the particle size.

Different types of sub-micron alumina may be used in accordance with embodiments of the present invention. For example, the sub-micron alumina may be provided as a colloidal alumina dispersion that comprises sub-micron alumina particles suspended in base fluid such as water. Embodiments of the present invention also may include sub-micron alumina in a dry, free-flowing state. Alternatively, discrete particles of the sub-micron alumina may be agglomerated to form a cohesive mass. The agglomerated sub-micron alumina may then be included in the cement composition in embodiments of the present invention. It should be understood that the agglomerated sub-micron alumina generally should disperse into discrete particles of sub-micron alumina after mixing with the cement composition, either immediately after a delay period. Alternately, a suitable dispersant, for example an anionic acrylate polymer or suitable surfactants, capable of dispersing agglomerated alumina into discrete particles of sub-micron alumina may be added to mix water, followed by solid alumina or a dispersion in a base fluid, and finally solid cement blend. Alternately, solid alumina powder may be coated with a dispersing compound capable of dispersing agglomerated alumina into discrete particles of sub-micron alumina and used as a solid additive to cement blend or to mix water.

Sub-micron alumina differs from larger-sized particulate materials (e.g., larger-sized particulate alumina) particular that may be included cement compositions due to its high surface to volume ratio. The area of the interface between the cement matrix and the sub-micron alumina is typically an order of magnitude greater than that in compositions containing larger-sized composite materials. Due to their high surface energy, the sub-micron alumina may exhibit improved properties as compared to larger-sized materials.

It is now recognized that the sub-micron alumina utilized with present embodiments, may have an impact on certain physical characteristics of the cement compositions. For example, relative to cement compositions that do not contain sub-micron alumina, inclusion of sub-micron alumina may provide for more rapid strength development as well as accelerated setting. More particularly, inclusion of a colloidal sub-micron alumina dispersion in a cement slurry in an amount of about 0.2 gallons per 94-pound sack of cement ("gps") may increase the strengths from about 20% to about 65% after twenty-four hours compared to an identical slurry without sub-micron alumina, in accordance with embodiments of the present invention. In addition, inclusion of a colloidal sub-micron alumina dispersion in a latex-containing composition in an amount of 0.05 gps to about 0.2 gps may increase strength by at least about 85% after forty-eight hours with potentially up to 2.5 times higher strength after forty-eight hours. The colloidal alumina dispersion may contain, for example, about 10% to about 30% dispersed sub-micron alumina phase (e.g., 400 nm to 500 nm) by weight.

Accordingly, a cement composition in accordance with present embodiments may comprise a sufficient amount of the sub-micron alumina to provide the desired characteristics (e.g., strength development) for the cement composition. In some embodiments, the sub-micron alumina may be present in the cement composition in an amount in the range of about 0.1% to about 10% by weight of the cement on a dry basis ("bwoc") (e.g., about 0.5%, about 1%, about 2%, about 4%, about 6%, about 8%, etc.). More particularly, the sub-micron alumina may be present in embodiments of the cement composition in an amount in the range of about 0.5% to about 5% bwoc.

The water used in embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In certain embodiments, the water may be present in the cement compositions in an amount in the range of about 33% to about 200% bwoc. In certain embodiments, the water may be present in an amount in the range of about 35% to about 70% bwoc.

Moreover, embodiments of the cement compositions of the present invention also may comprise latex. As will be understood by those skilled in the art, the latex may comprise any of a variety of rubber materials that are commercially available in latex form, either as aqueous emulsions or dry powders. Suitable rubber materials include natural rubber (e.g., cis-1, 4-polyisoprene), modified natural rubber, synthetic rubber, and combinations thereof. Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, and AMPS-styrene-butadiene rubber, combinations thereof. As used herein, the term "AMPS" refers to 2-acrylamido-2-methylpropanesulfonic acid and salts thereof. In certain embodiments, the synthetic rubber may comprise AMPS in an amount ranging from about 7.5% to about 10%, styrene in an amount ranging from about 30% to about 70% and butadiene in an amount ranging from about 30% to about 70%. Examples of suitable AMPS-styrene-butadiene rubbers are described in more detail in U.S. Pat. Nos. 6,488,764 and 6,184,287, the entire disclosures of which are incorporated herein by reference. Those of ordinary skill in the art will appreciate that other types of synthetic rubbers are also encompassed within the present invention.

In certain embodiments, the latex comprises an aqueous emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit steric effects and which contain long ethoxylate or hydrocarbon tails also may be present.

In accordance with embodiments of the present invention, the weight ratio of the styrene to the butadiene in the latex may be in the range of about 10:90 to about 90:10. In some embodiments, the weight ratio of the styrene to the butadiene in the emulsion may be in the range of about 20:80 to about 80:20. An example of a suitable styrene-butadiene latex has a styrene-to-butadiene weight ratio of about 25:75 and comprises water in an amount of about 50% by weight of the emulsion. Such a styrene-butadiene latex is available from Halliburton Energy Services, Inc., Duncan, Okla., under the name Latex 2000™ cement additive. Another example of a suitable styrene-butadiene latex has a styrene-to-butadiene weight ratio of about 30:70.

Where used, the latex may be provided in the cement compositions of the present invention in an amount sufficient for the desired application. In some embodiments, the latex may be included in the cement compositions in an amount in the range of about 2% to about 45% bwoc. In some embodiments, the latex may be included in the cement compositions in an amount in the range of about 5% to about 27% bwoc.

Embodiments of the cement compositions of the present invention also may comprise a latex stabilizer. Among other things, the latex stabilizer may be included in embodiments of the cement compositions for preventing the cement compositions from prematurely coagulating. Suitable latex stabilizers may include a surfactant or combination of surfactants for preventing the premature inversion of the latex emulsion. Examples of suitable latex stabilizers include, but are not limited to, surfactant molecules containing ethoxylated alkyl sulfonates and sulfates. Additional examples of suitable latex stabilizing surfactants which are suitable for this purpose may have the formula R-Ph-O(OCH$_2$CH$_2$)$_m$OH where R contains an alkyl group of from about 5 to about 30 carbon atoms, Ph contains a phenyl group, and m is an integer having value between 5 to 50. An example of a surfactant of this formula is ethoxylated nonylphenyl containing in the range of about 20 to about 30 moles of ethylene oxide. Another example of a suitable surfactant is a salt having the formula R$_1$(R$_2$O)$_n$SO$_3$X where R$_1$ contains an alkyl group having 5 to 20 carbon atoms, R$_2$ contains the group —CH$_2$—CH$_2$—, n is an integer having value in between 10 to 40, and X is any suitable cation. An example of surfactant of this formula is the sodium salt of a sulfonated compound derived by reacting a C$_{12-15}$ alcohol with about 15 moles of ethylene oxide having the formula H(CH$_2$)$_{12-15}$(CH$_2$CH$_2$O)$_{15}$SO$_3$Na. Specific examples of suitable latex stabilizers include Stabilizer 434B™ latex stabilizer, Stabilizer 434C™ latex stabilizer, and Stabilizer 434D™ latex stabilizer, which are available from Halliburton Energy Services, Inc. While embodiments of the present invention encompass a wide variety of different latex stabilizers and amounts thereof that may be included in the cement compositions of the present invention depending on the particular latex used and other factors, the latex stabilizer may be included in embodiments of the cement compositions in an amount in the range of about 0% to about 30% by weight of the aqueous latex in the cement composition and, alternatively, about 10% to about 20% by weight.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, fluid loss control additives, defoaming agents, foaming agents, thixotropic additives, nano-particles, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, nano-clays (e.g., naturally occurring, organically modified), nano-silica, nano-zinc oxide, nano-boron, nano-iron oxide, nano-zirconium oxide, nano-magnesium oxide, nano-barite, combinations thereof, and the like. A person having ordinary skill in the art, with the benefit of this disclosure, will readily be able to determine the type and amount of additive useful for a particular application and desired result.

An example of a cement composition of the present invention comprises Portland cement, colloidal alumina dispersions in an aqueous base fluid in an amount of about 0.05 gps to about 0.2 gps, and water. The colloidal alumina dispersions may comprise sub-micron alumina in an amount of about 10% to about 30% by weight of the dispersions. Embodiments of the example cement composition further may comprise an aqueous latex, such as styrene-butadiene latex or AMPS-styrene-butadiene latex. Additional additives may include a defoaming agent (such as D-AIR 3000L™ defoamer), a cement set retarder (such as HR-6L retarder), and a cement dispersant (such as CFR-3L dispersant).

Another example of a cement composition of the present invention comprises Portland cement, colloidal alumina dispersions in an aqueous base fluid in an amount of about 0.05 gps to about 0.2 gps, styrene-butadiene latex in an amount of about 1.5 gps, and water. The colloidal alumina dispersions may comprise sub-micron alumina in an amount of about 10% to about 30% by weight of the dispersions. Embodiments of the example cement composition further may comprise an aqueous latex, such as styrene-butadiene latex or AMPS-styrene-butadiene latex. Additional additives may include a defoaming agent (such as D-AIR 3000L™ defoamer), a latex stabilizer (such as Stabilizer 434D™ latex stabilizer), a cement set retarder (such as HR-6L retarder), and a cement dispersant (such as CFR-3L dispersant).

As will be appreciated by those of ordinary skill in the art, embodiments of the cement compositions of the present invention may be used in a variety of subterranean applications, including primary and remedial cementing. Embodiments of the cement compositions may be introduced into a subterranean formation and allowed to set therein. Embodiments of the cement compositions may comprise, for example, cement, sub-micron alumina, and water. Embodiments of the cement compositions further may comprise latex in certain applications.

In primary cementing embodiments, for example, a cement composition may be introduced into a space between a subterranean formation and a conduit (e.g., pipe string) located in the subterranean formation. The cement composition may be allowed to set to form a hardened mass in the space between the subterranean formation and the conduit. Among other things, the set cement composition may form a barrier, preventing the migration of fluids in the well bore. The set cement composition also may, for example, support the conduit in the well bore.

In remedial cementing embodiments, a cement composition may be used, for example, in squeeze-cementing operations or in the placement of cement plugs. By way of example, the cement composition may be placed in a well bore to plug a void or crack in the conduit or the cement sheath or a microannulus between the cement sheath and the conduit.

To facilitate a better understanding of the present technique, the following examples of some specific embodiments are given. In no way should the following examples be read to limit, or to define, the scope of the invention.

Example 1

This example was performed to analyze the effect of including sub-micron alumina in a cement composition. For this example, six different slurries were prepared. The cement compositions were then tested to determine their rate of strength development and thickening times. As set forth below, the respective test results for the six different slurries demonstrate that inclusion of sub-micron alumina in the slurry provides faster early strength development and shortened thickening times.

Slurries 1-6 each included Portland Class H cement, 0.05 gps of a defoamer (D-AIR 3000L™ available from Halliburton Energy Services, Inc.), and sufficient water to provide the density listed in the table below. Slurries 2, 4, and 6 also included a colloidal alumina dispersion in an amount of 0.2 gps. The colloidal alumina dispersion was supplied by Bee Chems, India and contained sub-micron alumina (400 nm to 500 nm) in an aqueous base fluid in an amount of about 20% by weight.

After the six slurries were prepared, tests were performed to determine various physical characteristics associated with inclusion of the sub-micron alumina in each of the slurries. One of these tests was performed to determine the rate of strength development for each of the slurries. An ultrasonic cement analyzer ("UCA") available from FANN Instrument Company, USA (Controller Model 304) was used to determine the compressive strength rate as a function of time. The rate of strength development was calculated as the slope of the initial linear part (starting from the onset of the strength development) of the compressive strength versus time graph. Additionally, the UCA was also used to determine the compressive strength of the slurries after twenty-four hours and the time for the slurries to develop a compressive strength of 500 psi. The thickening time associated with each slurry was determined by performing a thickening-time test at 125° F. in accordance with API Recommended Practice 10B-2. The thickening time for each slurry was defined as time required for the respective slurry to reach a consistency of 70 Bearden units (Bc) at 125° F.

The results of these tests are provided in the table below.

TABLE 1

Effect of Sub-Micron Alumina on Development of High-Early Strength and Thickening Times in Latex-Containing Slurries

| Slurry | Slurry Density (lb/gal) | Colloidal Sub-Micron Alumina Dispersion (gps) | UCA at 100° F. | | | Thickening Time @ 5160 psi and 125° F. (hr:min) |
|---|---|---|---|---|---|---|
| | | | Rate of Strength Development (psi/hr) | Time for 500 psi (hr:min) | Strength @ 24 hrs (psi) | |
| 1 | 13 | — | 28 | 23:29 | 510 | 10:45 |
| 2 | 13 | 0.2 | 36 | 17:39 | 613 | 1:37 |
| 3 | 14 | — | 35 | 18:31 | 657 | 4:10 |
| 4 | 14 | 0.2 | 80 | 10:38 | 1189 | 2:04 |
| 5 | 16.4[1] | — | 134 | 9:17 | 2065 | 2:03 |
| 6 | 16.4[1] | 0.2 | 263 | 5:29 | 3414 | 1:12 |

[1]Gelling behavior was observed for this density.

Table 1 illustrates the development of high-early strength for slurries containing sub-micron alumina. In particular, as compared to slurries without sub-micron alumina, the compressive strength obtained in twenty-four hours increased dramatically for the slurries containing sub-micron alumina with the increase in compressive strength from 20% to 65%, depending on, for example, slurry density. Moreover, the time required for the development of 500 psi was considerably shorter as compared to the slurries without sub-micron alumina. Moreover, the thickening times in Table 1 also indicate that slurries containing sub-micron alumina should also have shorter thickening times, and yet of sufficient duration to meet placement requirements, suggesting that sub-micron alumina may act as a set accelerator, in addition to acting as a strength enhancer and as an additive for increasing rates of strength development.

Example 2

This example was performed to compare sub-micron alumina with a conventional cement set accelerator (Econolite™ additive). For this example, four different slurries were prepared. The cement compositions were then tested to determine their rate of strength development and thickening times. As set forth below, the respective test results for the four different slurries demonstrate that inclusion of sub-micron alumina in the slurry provides comparable results to the Econolite™ additive at a reduced quantity.

Slurries 7-10 each included Portland Class H cement, 0.05 gps of a defoamer (D-AIR 3000L™ available from Halliburton Energy Services, Inc.), and sufficient water to provide the density listed in the table below. Slurry 8 also included Econolite™ additive, available from Halliburton Energy Services, Inc. Slurries 9-10 also included a colloidal alumina dispersion supplied by Bee Chems, India. The colloidal alumina dispersion contained sub-micron alumina (400 nm to 500 nm) in an aqueous base fluid in an amount of about 20% by weight.

After the four slurries were prepared, tests were performed to compare various physical characteristics of each of the slurries. One of these tests was performed to determine the rate of strength development for each of the slurries. A UCA was used to determine the compressive strength rate as a function of time. The rate of strength development was calculated as the slope of the initial linear part (starting from the onset of the strength development) of the Compressive strength versus Time graph. Additionally, the UCA was used to determine the compressive strength of the slurries after twenty-four hours and the time for the slurries to develop a compressive strength of 500 psi. The thickening time associated with each cement slurry was determined by performing a thickening-time test at 125° F. in accordance with API Recommended Practice 10B-2. The thickening time for each slurry was defined as the time required for the respective slurry to reach a consistency of 70 Bc at 125° F.

The results of these tests are provided in the table below.

TABLE 2

Comparison of Sub-Micron Alumina With a Conventional Cement Set Accelerator

| Slurry | Slurry Density (lb/gal) | Accelerator | | UCA at 100° F. | | | Thick. Time @ 5160 psi and 125° F. (hr:min) |
|---|---|---|---|---|---|---|---|
| | | Type | Amt (gps) | Rate of Strength Development (psi/hr) | Time for 500 psi (hr:min) | Strength @ 24 hrs (psi) | |
| 7 | 12.5 | — | — | 30 | 21:08 | 547 | n/d[1] |
| 8 | 12.5 | Econolite ™ Additive | 0.7 | 14 | 25:19 | 434 | 1:25 |
| 9 | 12.5 | Colloidal Sub-Micron Alumina Dispersion | 1.0[2] | 33 | 35:19 | 445 | 3:27 |

TABLE 2-continued

Comparison of Sub-Micron Alumina With a Conventional Cement Set Accelerator

| | | UCA at 100° F. | | | | | |
|---|---|---|---|---|---|---|---|
| Slurry | Slurry Density (lb/gal) | Accelerator Type | Amt (gps) | Rate of Strength Development (psi/hr) | Time for 500 psi (hr:min) | Strength @ 24 hrs (psi) | Thick. Time @ 5160 psi and 125° F. (hr:min) |
| 10 | 12.5 | Colloidal Sub-Micron Alumina Dispersion | 0.2 | 29 | 26:12 | 398 | 1:27 |

[1]The thickening time for Slurry 7 could not be measured precisely.
[2]The % solids in Slurry 9 was equivalent to the Econolite ™ in Slurry 8.

Table 2 illustrates that sub-micron alumina provides better strength development rates and reasonable thickening times when compared with a conventional cement set accelerator. More particularly, at the same slurry density, a lower quantity of sub-micron alumina provided equivalent results to that of the Econolite™ additive.

Example 3

This example was performed to compare sub-micron alumina with another conventional cement set accelerator (calcium chloride). For this example, three different slurries were prepared. The cement compositions were then tested to determine their rate of strength development and thickening times. As set forth below, the respective test results for the three different slurries demonstrate that inclusion of sub-micron alumina in the slurry provides comparable results to the calcium chloride at a lower quantity.

Slurries 11-13 each included Portland Class H cement, 0.05 gps of a defoamer (D-AIR 3000L™ available from Halliburton Energy Services, Inc.), and sufficient water to provide the density listed in the table below. Slurry 12 also included calcium chloride. Slurries 13 also included a colloidal alumina dispersion in an amount of 0.2 gps. The colloidal alumina dispersion was supplied by Bee Chems, India and contained sub-micron alumina (400 nm to 500 nm) in an aqueous base fluid in an amount of about 20% by weight.

After the three slurries were prepared, tests were performed to compare various physical characteristics of each of the slurries. One of these tests was performed to determine the rate of strength development for each of the slurries. A UCA was used to determine the compressive strength rate as a function of time. The rate of strength development was calculated as the slope of the initial linear part (starting from the onset of the strength development) of the Compressive strength versus Time graph. Additionally, the UCA was also used to determine the compressive strength of the slurries after twenty-four hours and the time for the slurries to develop a compressive strength of 500 psi. The thickening time associated with each cement slurry was determined by performing a thickening-time test at 125° F. in accordance with API Recommended Practice 10B-2. The thickening time for each slurry was defined as the time required for the respective slurry to reach a consistency of 70 Bc at 125° F.

The results of these tests are provided in the table below.

TABLE 3

Comparison of Sub-Micron Alumina With a Conventional Cement Set Accelerator

| | | UCA at 100° F. | | | | | |
|---|---|---|---|---|---|---|---|
| Slurry | Slurry Density (lb/gal)[1] | Accelerator Type | Amt | Rate of Strength Development (psi/hr) | Time for 500 psi (hr:min) | Strength @ 24 hrs (psi) | Thick. Time @ 5160 psi and 125° F. (hr:min) |
| 11 | 16.4 | — | — | 134 | 9:17 | 2065 | 2:03 |
| 12 | 16.4 | Calcium Chloride | 2% bwoc | 225 | 3:36 | 3400 | 00:49 |
| 13 | 16.4 | Colloidal Sub-Micron Alumina Dispersion | 0.2 gps | 263 | 5:29 | 3414 | 1:12 |

[1]At 16.4 lb/gal some gelling was noticed, regardless of the cement set accelerator.

Table 3 illustrates that sub-micron alumina provides comparable strength development rates and reasonable thickening times when compared with a conventional cement set accelerator. More particularly, at the same slurry density, a lower quantity of sub-micron alumina provided equivalent results to that of calcium chloride.

Example 4

This example was performed to analyze the effect of including sub-micron alumina in latex-containing cement compositions. For this example, four different slurries were prepared. The cement compositions were then tested to determine their rate of strength development and thickening times. As set forth below, the respective test results for the four different slurries demonstrate that inclusion of sub-micron alumina in the slurry provides higher early strengths and faster strength development rates with reasonable thickening times.

Slurries 14-17 each contained Portland Class H cement, latex in an amount of 1.5 gps, and a colloidal alumina dispersion in an amount ranging from 0 gps to 0.2 gps. Sufficient water was included in the slurries to provide a density of 16.4 lb/gal. Additional additives present in each slurry were D-AIR 3000L™ defoamer in an amount of 0.05 gps, Stabilizer 434D™ latex stabilizer in an amount of 0.2 gps, HR®-6L cement set retarder in an amount of 0.05 gps, and CFR-3L™ dispersant in an amount of 0.143 gps. The latex included in the slurries was Latex 2000™ cement additive having a particle size ranging from 150 nm to 200 nm. The colloidal alumina dispersion was supplied by Bee Chems, India and contained sub-micron alumina (400 nm to 500 nm) in an aqueous base fluid in an amount of about 20% by weight.

After the four slurries were prepared, tests were performed to compare various physical characteristics of each of the slurries. One of these tests was performed to determine the rate of strength development for each of the slurries. A UCA was used to determine the compressive strength rate as a function of time. The rate of strength development was calculated as the slope of the initial linear part (starting from the onset of the strength development) of the Compressive strength versus Time graph. Additionally, the UCA was also used to determine the compressive strength of the slurries after twenty-four and forty-eight hours. The thickening time associated with each cement slurry was determined by performing a thickening-time test in accordance with API Recommended Practice 10B-2. The thickening time for each slurry was based on the respective slurry reaching a consistency of 70 Bc at 80° F.

The results of these tests are provided in the table below.

TABLE 4

Effect of Sub-Micron Alumina Loading on Strength Development and Thickening Times on Slurries Containing Latex

| Slurry | Latex (gps) | Colloidal Sub-Micron Alumina Dispersion (gps) | Temp. (° F.) | UCA Rate of Strength Development (psi/hr) | Strength @ 24 hrs (psi) | Strength @ 48 hrs (psi) | Thick. Time @ 80° F. (hr:min) |
|---|---|---|---|---|---|---|---|
| 14 | 1.5 | 0.0 | 80 | 111 | 0 | 1503 | 28:53 |
| 15 | 1.5 | 0.05 | 80 | 145 | 0 | 2797 | 26:30 |
| 16 | 1.5 | 0.1 | 80 | 144 | 573 | 3159 | 14:26 |
| 17 | 1.5 | 0.2 | 80 | 168 | 1495 | 4019 | 6:56 |

Table 4 illustrates that there were significant increases in twenty-four hour and forty-eight hour compressive strength values as the concentration of sub-micron alumina was increased from 0 gps to 0.2 gps. As compared to the neat latex slurry, the forty-eight hour compressive strength increased almost 2.5 times by addition of 0.2 gps of sub-micron alumina. It should be noted that the test temperature was 80° F. At 0.2 gps of sub-micron alumina, the slurry had a reasonable thickening time of 6 hours and 56 minutes. The neat latex slurry at this temperature took more than 28 hours to reach 70 Bc. The results indicate that sub-micron alumina when added to latex-containing cement slurries acts as a set accelerator, a strength enhancer and provides for increased rates of strength development at low temperatures.

Example 5

This example was performed to analyze the effect of temperature variation on the rate of strength development for slurries containing latex and sub-micron alumina. For this example, three different slurries were prepared. The cement compositions were then tested to determine their rate of strength development and thickening times. As set forth below, the respective test results for the three different slurries demonstrate that sub-micron alumina can be used as an accelerator for latex-containing cement slurries at low temperatures.

Slurries 18-20 each contained Portland Class H cement, latex in an amount of 1.5 gps, and a colloidal alumina dispersion in an amount of about 0.2 gps. Sufficient water was included in the slurries to provide a density of 16.4 lb/gal. Additional additives present in each slurry were D-AIR 3000L™ defoamer in an amount of 0.05 gps, Stabilizer 434D™ latex stabilizer in an amount of 0.2 gps, HR®-6L cement set retarder in an amount of 0.05 gps, and CFR-3L™ dispersant in an amount of 0.143 gps. The latex included in the slurries was Latex 2000™ cement additive having a particle size ranging from 150 nm to 200 nm. The colloidal alumina dispersion was supplied by Bee Chems, India and contained sub-micron alumina (400 nm to 500 nm) in an aqueous base fluid in an amount of about 20% by weight.

After the three slurries were prepared, tests were performed to determine various physical characteristics associated with varying the temperature on slurries containing latex and sub-micron alumina. One of these tests was performed to determine the rate of strength development for each of the slurries. A UCA was used to determine the compressive strength rate as a function of time. The rate of strength development was calculated as the slope of the initial linear part (starting from the onset of the strength development) of the Compressive strength versus Time graph. Additionally, the UCA was also used to determine the compressive strength of the slurries after twenty-four, forty-eight hours, seventy-two hours. The forty-eight and seventy-two hour compressive strength values were not determined for Slurry 20 because it had higher strength at twenty-four hours. The seventy-two hour compressive strength value was not determined for Slurry 19 because it had higher strength at forth-eight hours. The thickening time associated with each cement slurry was determined by performing a thickening-time test in accordance with API Recommended Practice 10B-2. The thickening time for each slurry was based on the respective slurry reaching a consistency of 70 Bc at 80° F.

The results of these tests are provided in the table below.

TABLE 5

Effect of Temperature on Strength Development for Slurries Containing Latex and Sub-Micron Alumina

| Slurry | Latex (gps) | Colloidal Sub-Micron Alumina Dispersion (gps) | Temp. (° F.) | UCA Rate of Strength Development (psi/hr) | Strength @ 24 hrs (psi) | Strength @ 48 hrs (psi) | Strength @ 72 hrs (psi) | Thickening Time @ 80° F. (hr:min) |
|---|---|---|---|---|---|---|---|---|
| 18 | 1.5 | 0.2 | 40 | 90 | 58 | 61.7 | 1014 | 18:41 |
| 19 | 1.5 | 0.2 | 80 | 168 | 195 | 4019 | not measured | 6:56 |
| 20 | 1.5 | 0.2 | 120 | 297 | 2572 | not measured | not measured | 1:29 |

Table 5 illustrates that sub-micron alumina may be a suitable set accelerator at low temperatures for latex-containing slurries. Even at a low temperature of 40° F., a compressive strength of 1014 psi was obtained in seventy-two hours for Slurry 18. The rate of strength development increased as the temperature increased from 40° F. to 120° F. Thickening times decreased as the temperature was increased.

Example 6

This example was performed to compare the performance of sub-micron alumina with nano-silica and sub-micron calcium carbonate. For this example, four different slurries were prepared. The cement compositions were then tested to determine their rate of strength development and thickening times. As set forth below, the respective test results for the four different slurries demonstrate that inclusion of sub-micron alumina in the slurry provides higher compressive strength with reasonable thickening times.

Slurries 21-24 each included Portland Class H cement, latex in an amount of 1.5 gps, and sufficient water to provide a density of 16.4 lb/gal. Additional additives present in each slurry were D-AIR 3000L™ defoamer in an amount of 0.05 gps, Stabilizer 434D™ latex stabilizer in an amount of 0.2 gps, HR®-6L cement set retarder in an amount of 0.05 gps, and CFR-3L™ dispersant in an amount of 0.143 gps. Slurry 22 also included a colloidal nano-silica dispersion (0.2 gps) supplied by Bee Chems, India, under the trade name CemSyn LP (6 nm). The colloidal nano-silica dispersion contained nano-silica (6 nm) in an amount of about 15% by weight. Slurry 23 also included a colloidal calcium carbonate dispersion (0.3 gps) supplied by Revertex-KA Latex (India) Private Limited. The colloidal calcium carbonate dispersion contained sub-micron calcium carbonate (200 nm to 800 nm) in an amount of 75.5% by weight. Slurry 24 also included a colloidal alumina dispersion (0.2 gps) supplied by Bee Chems, India. The colloidal alumina dispersion contained sub-micron alumina (400 nm to 500 nm) in an aqueous base fluid in an amount of about 20% by weight.

After the four slurries were prepared, tests were performed to compare various physical characteristics of each of the slurries. A UCA was used to determine the compressive strength rate as a function of time. The rate of strength development was calculated as the slope of the initial linear part (starting from the onset of the strength development) of the Compressive strength versus Time graph. Additionally, the UCA was also used to determine the compressive strength of the slurries after forty-eight hours. The thickening time associated with each cement slurry was determined by performing a thickening-time test in accordance with API Recommended Practice 10B-2. The thickening time for each slurry was based on the respective slurry reaching a consistency of 70 Bc at 125° F.

The results of these tests are provided in the table below.

TABLE 6

Comparison of Sub-Micron Alumina With Nano-Silica and Sub-Micron CaCO₃ for Latex-Containing Slurries

| Slurry | Latex (gps) | Colloidal Dispersion Type | Amt[1] | Temp (° F.) | UCA Rate of Strength Development (psi/hr) | Strength @ 48 hrs (psi) | Thick Time at 5160 psi and 125° F. (hr:min) |
|---|---|---|---|---|---|---|---|
| 21 | 1.5 | — | — | 80 | 111 | 1503 | 28:53 |
| 22 | 1.5 | Nano-Silica | 0.2 gps | 80 | 134 | 2933 | 15:26 |
| 23 | 1.5 | Sub-Micron CaCO₃ | 0.3 gps | 80 | 182 | 2274 | 19:16 |
| 24 | 1.5 | Sub-Micron Alumina | 0.2 gps | 80 | 168 | 4019 | 6:56 |

[1]This comparison was performed using a loading of the nano-silica, sub-micron calcium carbonate, or sub-micron alumina that was found to be best for slurry performance.

Accordingly, Table 6 illustrates that sub-micron alumina provides higher strengths and faster set acceleration times when compared with nano-sized silica and sub-micron calcium carbonate, especially at 80° F.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing in a subterranean formation:
providing a hydraulic cement,
providing sub-micron alumina particles,
preparing a cement composition comprising the hydraulic cement, the sub-micron alumina particles, and water, wherein the sub-micron alumina particles have a particle size in a range of from about 150 nm to about 950 nm, and wherein the sub-micron alumina particles are present in an amount in a range of from 0.1% to about 10% by weight of the hydraulic cement on a dry basis;
introducing the cement composition into a subterranean formation; and
allowing the cement composition to set in the subterranean formation.

2. The method of claim 1 wherein the hydraulic cement comprises at least one hydraulic cement selected from the group consisting of a Portland cement, a pozzolana cement, a gypsum cement, a high-alumina-content cement, a slag cement, a silica/lime cement, and any combination thereof.

3. The method of claim 1 wherein the cement composition comprises belite in an amount from 0.1% to about 50% by weight of calcium silicates in the cement composition.

4. The method of claim 1 wherein the cement composition comprises a colloidal alumina dispersion comprising sub-micron alumina particles suspended in a base fluid.

5. The method of claim 1 comprising providing the sub-micron alumina particles in a dry, free-flowing form.

6. The method of claim 1 wherein the sub-micron alumina particles have a particle size in the range of about 400 nm to about 500 nm.

7. The method of claim 1 wherein the sub-micron alumina particles are present in the cement composition in an amount in the range of about 0.5% to about 5% by weight of the hydraulic cement on a dry basis.

8. The method of claim 1 wherein the cement composition further comprises a latex.

9. The method of claim 8 wherein the latex comprises at least one rubber material selected from the group an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, and any combination thereof.

10. The method of claim 1 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and any combination thereof.

11. The method of claim 1 wherein the cement composition further comprises at least one additive selected from the group consisting of a gas, crystalline silica, amorphous silica, fumed silica, a salt, a fiber, a hydratable clay, calcined shale, vitrified shale, a microsphere, fly ash, slag, diatomaceous earth, metakaolin, rice husk ash, a natural pozzolan, zeolite, cement kiln dust, lime, an elastomer, a resin, and any combination thereof.

12. The method of claim 1 wherein introducing the cement composition into the subterranean formation comprises introducing the cement composition into a well bore in a space between the subterranean formation and a conduit disposed in the well bore.

13. The method of claim 1 wherein introducing the cement composition into the subterranean formation comprises introducing the cement composition into a well bore having a bottomhole circulating temperature of about 40° F. to about 180° F.

14. A method of cementing in a subterranean formation:
providing a hydraulic cement,
providing sub-micron alumina particles,
preparing a cement composition comprising the hydraulic cement, the sub-micron alumina particles for accelerating setting of the cement composition, latex, and water, wherein the sub-micron alumina particles have a particle size of about 150 nm to about 950 nm, wherein preparing the cement composition comprises providing a colloidal alumina dispersion comprising the sub-micron alumina particles in an aqueous base fluid;
introducing the cement composition into a well bore in a space between the subterranean formation and a conduit disposed in the well bore; and
allowing the cement composition to set.

15. The method of claim 14 wherein the latex comprises a styrene-butadiene latex.

16. The method of claim 14 wherein the sub-micron alumina particles are present in the cement composition in an amount in the range of about 0.1% to about 10% by weight of the hydraulic cement on a dry basis, and wherein the sub-micron alumina particles have a particle size of about 400 nm to about 500 nm.

17. The method of claim 14 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and any combination thereof.

18. The method of claim 14 wherein the cement composition further comprises at least one additive selected from the group consisting of crystalline silica, amorphous silica, fumed silica, a salt, a fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, and any combination thereof.

19. The method of claim 14 wherein the well bore has a bottom hole circulating temperature of about 40° F. to about 180° F.

20. A method of cementing in a subterranean formation:
providing a hydraulic cement,
providing sub-micron alumina particles,
preparing a cement composition, wherein the cement composition comprises:
hydraulic cement;
sub-micron alumina particles having a particle size in a range of about 150 nm to about 950 nm, wherein the sub-micron alumina particles are present in the cement composition in an amount in a range of about 0.1% to about 10% by weight of the hydraulic cement on a dry basis; and
water;
introducing the cement composition into a subterranean formation; and
allowing the cement composition to set in the subterranean formation.

21. The method of claim 20 wherein the hydraulic cement comprises at least one hydraulic cement selected from the group consisting of a Portland cement, a pozzolana cement, a gypsum cement, a high-alumina-content cement, a slag cement, a silica/lime cement, and any combination thereof.

22. The method of claim 20 wherein the cement composition comprises belite in an amount from 0.1% to about 50% by weight of calcium silicates in the cement composition.

23. The method of claim 20 wherein the cement composition comprises a colloidal alumina dispersion comprising the sub-micron alumina particles suspended in a base fluid.

24. The method of claim 20 wherein the cement composition further comprises a latex.

25. The method of claim 24 wherein the latex comprises at least one rubber material selected from the group an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, and any combination thereof.

26. The method of claim 20 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and any combination thereof.

27. The method of claim 20 wherein the cement composition further comprises at least one additive selected from the group consisting of a gas, crystalline silica, amorphous silica, fumed silica, a salt, a fiber, a hydratable clay, calcined shale, vitrified shale, a microsphere, fly ash, slag, diatomaceous earth, metakaolin, rice husk ash, a natural pozzolan, zeolite, cement kiln dust, lime, an elastomer, a resin, and any combination thereof.

28. The method of claim 20 wherein introducing the cement composition into the subterranean formation comprising introducing the cement composition into a well bore in a space between the subterranean formation and a conduit disposed in the well bore.

29. The method of claim 28 wherein the well bore has a bottom hole circulating temperature of about 40° F. to about 180° F.

* * * * *